(12) United States Patent
Spindler et al.

(10) Patent No.: US 9,302,654 B2
(45) Date of Patent: Apr. 5, 2016

(54) DEVICE FOR DISPENSING TIRE SEALANT

(71) Applicants: Martin Patrick Spindler, Herdwangen-Schoenach (DE); Byron Peter Hutten, Owingen (DE); Henry Friedrich Ferdinand Klemm, Ueberlingen (DE); Volker Pfeifer, Sipplingen (DE)

(72) Inventors: Martin Patrick Spindler, Herdwangen-Schoenach (DE); Byron Peter Hutten, Owingen (DE); Henry Friedrich Ferdinand Klemm, Ueberlingen (DE); Volker Pfeifer, Sipplingen (DE)

(73) Assignee: Illinois Tool Works Inc., Glenview, IL (US)

( * ) Notice: Subject to any disclaimer, the term of this patent is extended or adjusted under 35 U.S.C. 154(b) by 264 days.

(21) Appl. No.: 13/837,857

(22) Filed: Mar. 15, 2013

(65) Prior Publication Data
US 2014/0209207 A1      Jul. 31, 2014

(51) Int. Cl.
*B60S 5/04*      (2006.01)
*B29C 73/16*      (2006.01)
*B29L 30/00*      (2006.01)

(52) U.S. Cl.
CPC ............... *B60S 5/04* (2013.01); *B29C 73/166* (2013.01); *B29L 2030/00* (2013.01)

(58) Field of Classification Search
CPC .... B29C 73/166; B29C 73/02; B29C 73/025; B60S 5/04; B29D 2030/0686; B29D 2030/0698

USPC .................................................. 141/38, 105
See application file for complete search history.

(56) References Cited

U.S. PATENT DOCUMENTS

| | | | |
|---|---|---|---|
| 5,195,427 A * | 3/1993 | Germano ........................ 99/472 |
| 6,789,581 B2 * | 9/2004 | Cowan et al. ................... 141/38 |
| 7,789,110 B2 * | 9/2010 | Marini ............................. 141/38 |
| 7,798,183 B2 * | 9/2010 | Cegelski et al. ................ 141/38 |
| 7,878,360 B2 * | 2/2011 | Takeda ...................... 220/203.13 |
| 8,146,622 B2 * | 4/2012 | Guan et al. ...................... 141/38 |
| 8,245,737 B2 | 8/2012 | Stehle | |
| 8,297,321 B2 * | 10/2012 | Chou .............................. 141/38 |
| 8,459,150 B2 * | 6/2013 | Yoshida et al. ................ 81/15.6 |
| 8,627,857 B2 * | 1/2014 | Chou .............................. 141/38 |
| 8,640,744 B2 * | 2/2014 | Dowel ............................ 141/38 |
| 2003/0056851 A1 | 3/2003 | Eriksen et al. | |
| 2008/0098855 A1 | 5/2008 | Cegelski et al. | |
| 2011/0011217 A1* | 1/2011 | Kojima .......................... 81/15.2 |

FOREIGN PATENT DOCUMENTS

| | | |
|---|---|---|
| DE | 20 2005 017 071 U1 | 4/2007 |
| DE | 20 2009 002 661 U1 | 9/2009 |
| DE | 10 2008 033 477 A1 | 4/2010 |
| DE | 10 2008 057 827 A1 | 5/2010 |
| EP | 1 894 707 A1 | 3/2008 |
| EP | 2 261 011 A1 | 12/2010 |
| EP | 2 305 570 A1 | 4/2011 |
| WO | WO 2010/097195 A1 | 9/2010 |

* cited by examiner

*Primary Examiner* — Timothy L Maust
(74) *Attorney, Agent, or Firm* — Pauley Erickson & Kottis

(57) ABSTRACT

In a device for dispensing tire sealant from a canister (17) by means of a pressure source (16), where the pressure source (16) and canister (17) are contained in a housing (1), the canister (17) in the housing (1) should be connected to the pressure source (16) in a removable fashion.

17 Claims, 6 Drawing Sheets

DEVICE FOR DISPENSING TIRE SEALANT

CROSS REFERENCE TO RELATED APPLICATION

German Patent Reference 10 2013 100 738.4, filed 25 Jan. 2013, the priority document corresponding to this invention, to which a foreign priority benefit is claimed under Title 35, United States Code, Section 119, and its entire teachings are incorporated, by reference, into this specification.

BACKGROUND OF THE INVENTION

1. Field of the Invention

The invention relates to a device for dispensing tire sealant from a canister by means of a pressure source, in which the pressure source and canister are contained in a housing.

2. Description of Prior Art

There are many different forms and designs of such devices that are known and currently available on the market. They are primarily used for introducing tire sealant into defective tires when a flat tire occurs and for sealing a defective tire. In these devices, a compressor presses compressed air into a canister of tire sealant and by means of corresponding dip tubes, the tire sealant is then pumped into the defective tire via a valve. After this, the valve can be switched so that the compressor can then inflate the tire. Standard functions from the prior art include either pumping only air in order to inflate balls or air mattresses or performing an air pressure check. In the repair function, the prior art is designed so that the introduction of sealant and air occurs in a single operation. Such devices are known, for example, from DE 20 2005 017 071 U1 and DE 20 2009 002 661 U1.

OBJECT OF THE INVENTION

The object of the present invention is to design a device of this kind in a more compact way and to facilitate its assembly and use.

ATTAINMENT OF THE OBJECT OF THE INVENTION

The object is attained by connecting the canister in the housing to the pressure source in a removable fashion.

This first feature of the present invention makes it possible to use the device multiple times. According to the previously known prior art, once the device is used, it can only be replaced with a whole new device, including replacement of the pressure source, etc. The present invention, however, makes it possible to replace the canister in the housing without the use of tools, thus permitting the actual device to be used multiple times. A replacement and reuse are therefore possible, which were not possible in the prior art because in the prior art, it was not possible to replace the sealant canister without using tools.

Since only the canister is replaced according to the invention, only this part of the device is made to be openable. This means that preferably, the part of the device containing the pressure source remains closed. In this case, the pressure source has a fitting that reaches into the compartment containing the canister so that a canister equipped with a nipple associated with this fitting can be connected to the latter. This occurs in such a way that the fitting and nipple produce a sealed connection so that no leakage occurs between the fitting and nipple. Naturally, this arrangement can also be reversed, i.e. a nipple protrudes from the pressure source, which engages in a fitting on the canister.

In a preferred exemplary embodiment of the invention, the nipple is part of a valve with which the device can be switched back and forth between different function modes. In a first function mode, the compressed air source is disconnected from the canister so that no compressed air travels into the canister or out through a hose. In a second function mode of the valve, the pressure source is directly connected to a hose, which leads, for example, to a vehicle tire or another item to be inflated such as an air mattress or the like. A third function mode is then produced when the valve connects the pressure source to the canister so that the sealant from the canister can be pressed through a hose into a vehicle tire, for example. This primarily occurs when the vehicle tire needs to be sealed.

In order to minimize the overall size of the whole device, the canister should also be completely integrated into the housing. This integration, however, makes it impossible to slide the canister for example laterally into a corresponding compartment in the housing so that the nipple and fitting can be connected to each other. According to the invention, the canister is therefore tilted so that it can be inserted into the compartment provided for it in the housing and then the nipple can be slid into the fitting. After the nipple is connected to the fitting, the canister is then pivoted into the compartment provided for it and can thus assume its home position.

Preferably, the housing has a receptacle for containing the canister and pressure source. The two are preferably also separated from each other by a wall, thus assuring that the compartment containing the pressure source can remain closed while the compartment containing the canister is openable. The partition wall mentioned above has cutout via which the fitting extends into the compartment containing the canister.

An interior wall should extend around the canister and pressure source. This forms the two compartments for the pressure source and canister.

According to the invention, an outer wall is also provided and a receiving trough is formed between the inner wall and outer wall. This receiving trough can accommodate other functional elements of the device according to the invention, in particular a connecting cable or a supply hose for tire sealant or also an electrical connection. The outer wall in this case can be embodied as closed, but it can also have openings such as a window in order to provide visual access to additional information on the canister.

As mentioned above, a cover for the receptacle should preferably be composed of at least two parts, with one cover part being placed over the pressure source and permanently anchored to the receptacle. The other cover part over the canister preferably engages with the receptacle by means of clip connections so that it can be detached from the receptacle. This cover part also preferably has an opening or cutout through which the canister is visible. It is therefore possible not only to check the content level in the canister, but also to read any labeling on the canister.

Another component of the present invention for which separate protection is also claimed relates to the pressure source. Preferably, it is embodied in the form of a compressed air source, e.g. embodied in the form of a compressor. This compressor is composed of three parts, namely a motor with a fan impeller, a transmission part, and a pressure buildup element. All of the elements of this pressure source according to the invention, however, are arranged in linear fashion, i.e. the movement of an output shaft of the motor is transmitted to the pressure buildup element in linear fashion. No bending of the element occurs. This keeps the whole pressure source very flat, which in turn results in a reduction in the overall space required. A compressor of this kind can naturally also be used in a wide range of other tire sealant sets.

In order to produce a linear transmission, a bevel gear whose teeth engage with a bevel gear pinion is provided between the motor and the pressure buildup element. This bevel gear pinion is mounted on the output shaft of the motor and the above-mentioned fan impeller is situated at the opposite end of the output shaft from this bevel gear pinion.

The bevel gear in turn is eccentrically connected to a connecting rod of the pressure buildup element; the connecting rod drives a piston in the pressure buildup element in a known way in order to produce a pressure. This connecting rod is situated so that it is axially parallel to the output shaft of the motor. This produces the linear arrangement of the entire pressure source.

Another special feature of the invention is the provision of a transmission housing. This transmission housing connects the motor and pressure buildup element to each other and contains the bevel gear, the bevel gear pinion, and the connecting rod. It is preferably open in the direction toward the pressure buildup element and has grooves on the side that permit the pressure buildup element to be easily connected to the transmission housing by inserting an end plate provided on the pressure buildup element into the groove. This immobilizes the pressure buildup element relative to the transmission so that the pressure buildup element is not pushed or pulled relative to the transmission during operation of the connecting rod.

The output shaft of the motor engages in the transmission housing from the other side, with the bevel gear pinion being mounted to the drive shaft inside the transmission housing.

This transmission housing can be a separate part, but is preferably injection molded into the interior of the receptacle during the manufacture of the receptacle.

DESCRIPTION OF DRAWINGS

Other advantages, features, and details of the invention ensue from the following description of preferred exemplary embodiments and from the drawings; in the drawings.

Figure 1:
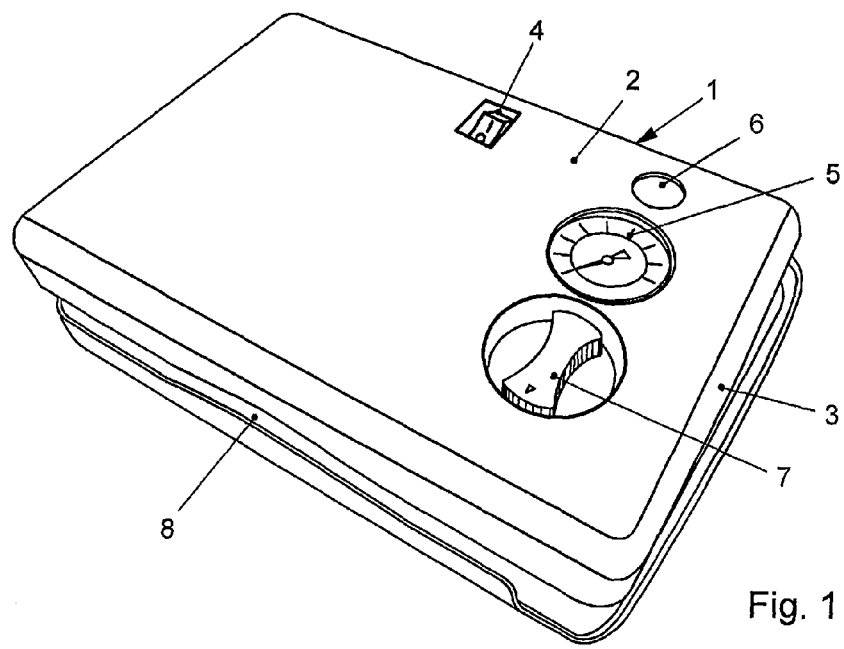
FIG. 1 is a perspective view of a device according to the invention for dispensing tire sealant.

According to FIG. 1, a device according to the invention for dispensing tire sealant has a housing 1. This housing is essentially composed of a receptacle 2 and a cover 3. Functional elements are provided in corresponding openings in the receptacle 2. These include a switch 4 for switching the device on and off, a manometer 5 for measuring the pressure built up by a pressure source that will described below, a pressure release button 6 for releasing excess pressure, and a rotary switch 7 for actuating a valve that will also be described below.

Between the receptacle 2 and the cover 3, a circumferential slot 8 is provided into which a cable for operating the device and possibly also a hose for dispensing a tire sealant can be inserted. A similar design is described in DE 20 2009 002 661.

Figure 4:
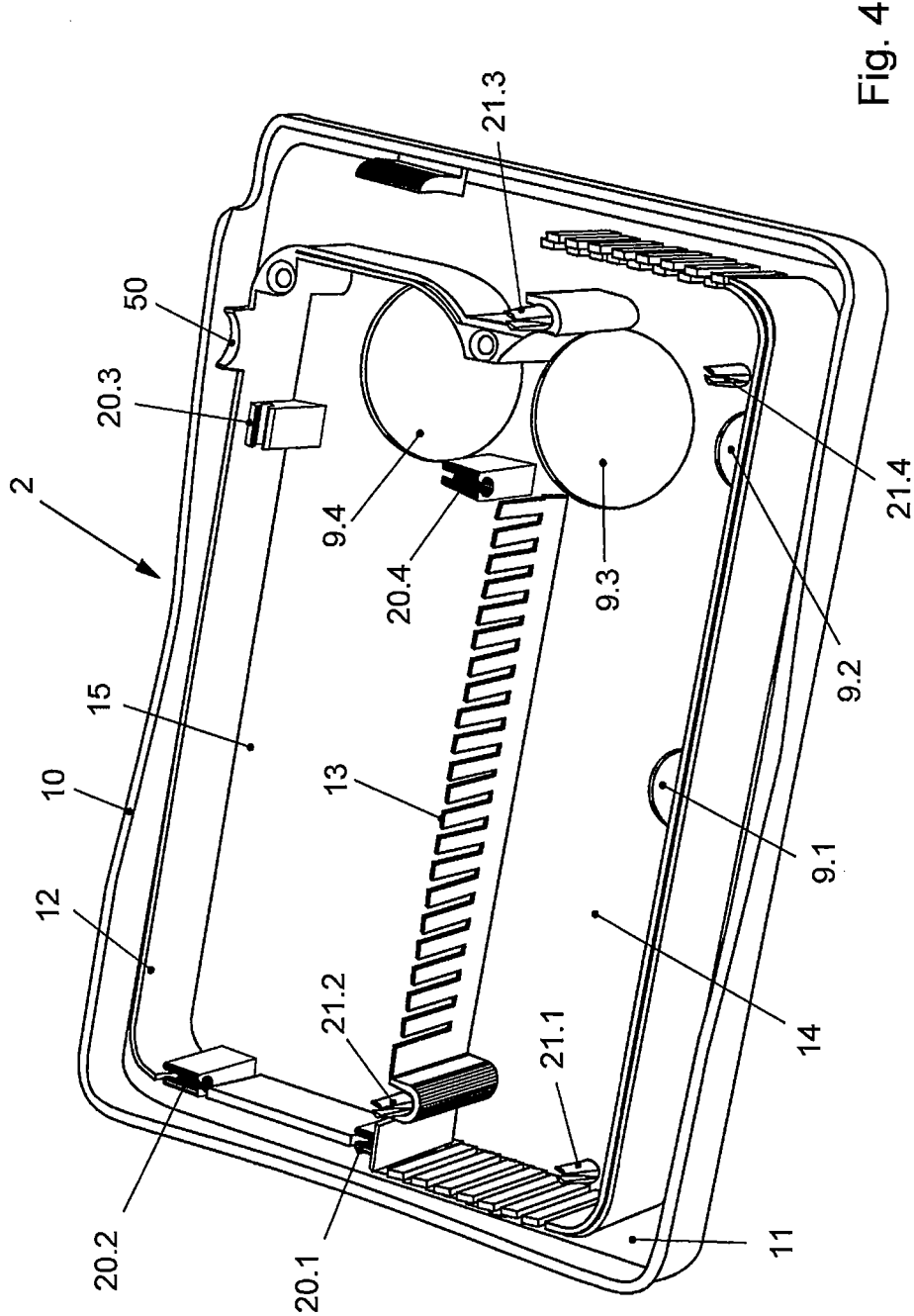
FIG. 4 is a perspective view of a receptacle as part of a housing of the device according to FIG. 1.

According to FIG. 4, aside from the corresponding openings 9.1 through 9.4 for the switch 4, manometer 5, pressure release button 6, and rotary switch 7, the receptacle 2 has an essentially circumferential, partially corrugated outer wall 10, which extends at least partway around an inner wall 12 to form a receiving trough 11. Inside the compartment enclosed by the inner wall 12, a partition wall 13 forms two compartments 14 and 15, which serve to contain a compressed air source 16 shown in FIG. 1 and a canister 17 for tire sealant.

Figure 5:
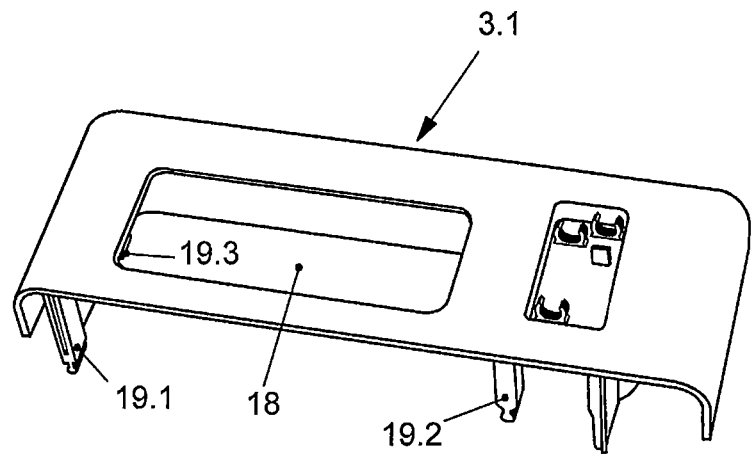
FIG. 5 is a perspective view of one part of a cover.
Figure 6:
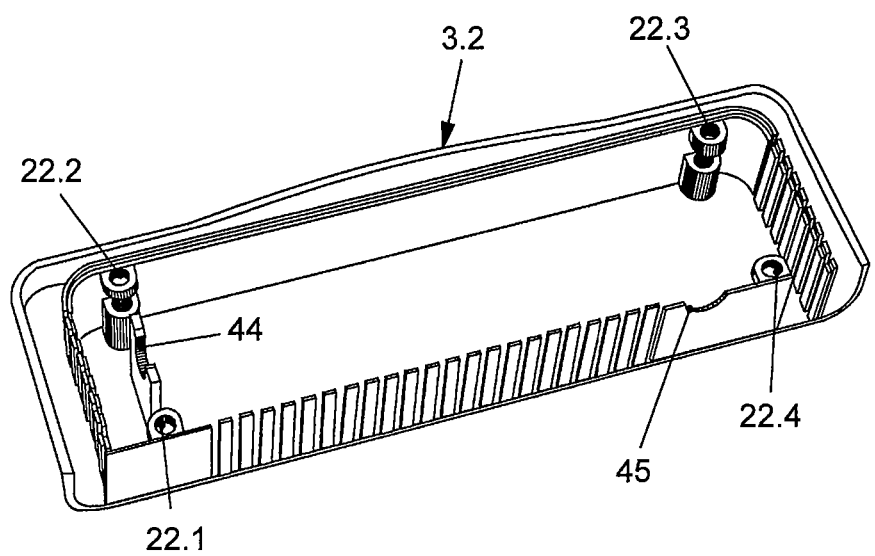
FIG. 6 is a perspective view of another part of a cover constituting part of the housing of the device according to FIG. 1.

The receptacle 2 is then associated with the cover 3, which according to FIG. 5 is composed of a cover part 3.1 for the canister; FIG. 6 shows a cover part 3.2 used for the compressed air source 16. The cover part 3.1 in this case has a large opening 18 through which the inserted canister 17 can be seen. In particular, it is possible to see relevant technical information, among other things, naturally also the expiration date.

In addition, clip feet 19.1 through 19.3 protrude from the cover 3.1 into the interior and cooperate with corresponding clip sockets 20.1 through 20.4 in the receptacle 2 (see FIG. 4). The clip feet 19 and clip sockets 20 are embodied to be flexible enough to permit the cover 3.1 to be taken off and put back. This is primarily done in order to replace the canister 17.

The cover part 3.2 according to FIG. 6 is affixed by means of undercut tabs 21.1 through 21.4 that protrude from corresponding stilts into the compartment 14 and in the operative position, cooperate with eyelets 22.1 through 22.4, which are formed onto the cover part 3.2. When these undercut tabs 21.1 through 21.4 are inserted into the eyelets 22.2 through 22.4, then they engage behind the eyelets; the connection cannot be opened without destroying them. Naturally, however, they can also be flexibly embodied so that they permit the connection to be reopened; in this case, it is sufficient for the undercut to be embodied in the form of a chamfer, for example.

Figure 8:
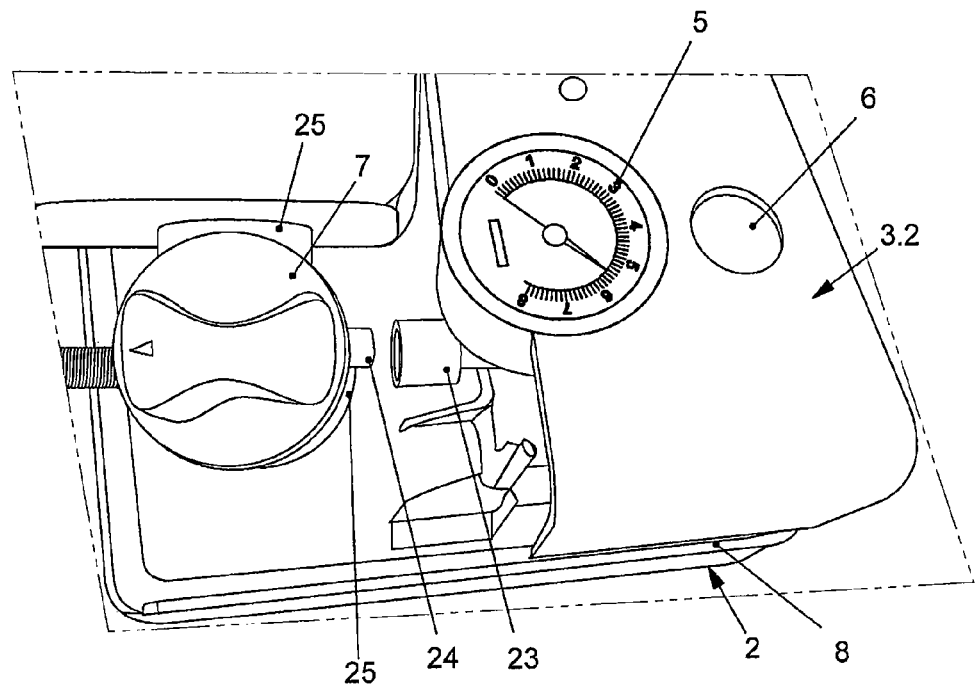
FIG. 8 is a partial view of the device according to FIG. 1 just before the canister valve and fitting on the pressure source are plugged together.

According to the invention, the canister 17 and compressed air source 16 are detachably connected to each other. For this purpose, according to FIGS. 8 and 9, a fitting 23 protrudes from the compressed air source 16 and a nipple 24 with a sealing ring 25 can be inserted into the fitting. It is also possible, however, to use a plurality of sealing rings here. This nipple 24 is part of a rotary valve 25, which can be actuated by means of the rotary switch 7. A rotary valve of this kind is described for example in DE 101 06 468, reference to which is expressly included herein.

The compressed air source 16 in the present case is preferably embodied in the form of a compressor. According to FIGS. 1 and 7, it has a motor 26 whose output shaft 27 drives a fan impeller 28 at one end. At the other end, a bevel gear pinion 29 is mounted on the output shaft 27 and engages with the teeth 30 of a bevel gear 31. A connecting rod 32 is connected to the bevel gear 31 in eccentric fashion and drives a piston, not shown in detail, in a pressure buildup element 33.

Figure 7:
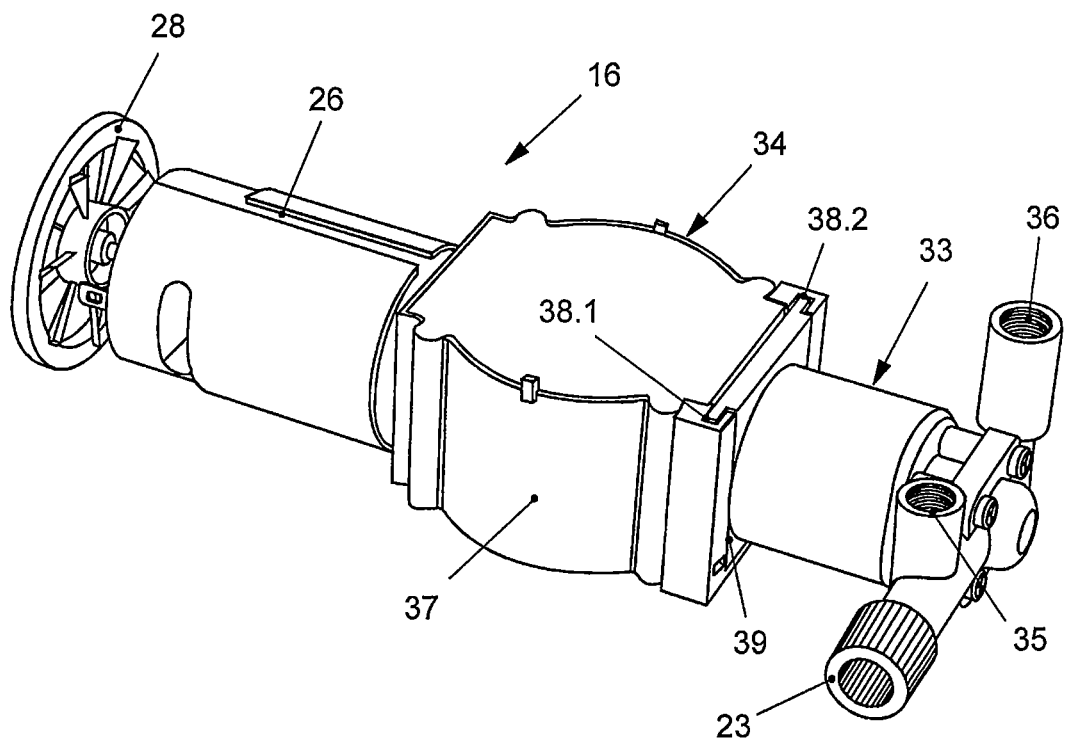
FIG. 7 is a perspective view of a pressure source according to the invention.

FIG. 7 shows an exemplary embodiment of a compressed air source 16 according to the invention in the installed position. The motor 26 with the fan impeller 28 is clearly connected to a transmission 34 in which primarily the bevel gear 31 rotates, which is engaged by the bevel gear pinion 29 of the one hand and by the connecting rod 32 on the other and adjoins the pressure buildup element 33 to which the fitting 23 is connected. The drawing also shows a connection 35 to the manometer and a connection 36 to the pressure release button 6.

An essential feature of the present invention is the fact that a transmission housing 37 is provided to permit assembly. It can be manufactured separately or can also be an integral component of the receptacle 2. It largely contains the transmission 34, but is also open in the forward direction toward the pressure buildup element 33 and in this location, has two vertical grooves 38.1 and 38.2 oriented toward each other into which an end plate 39 is inserted, which is part of the pressure buildup element 33.

Figure 9:
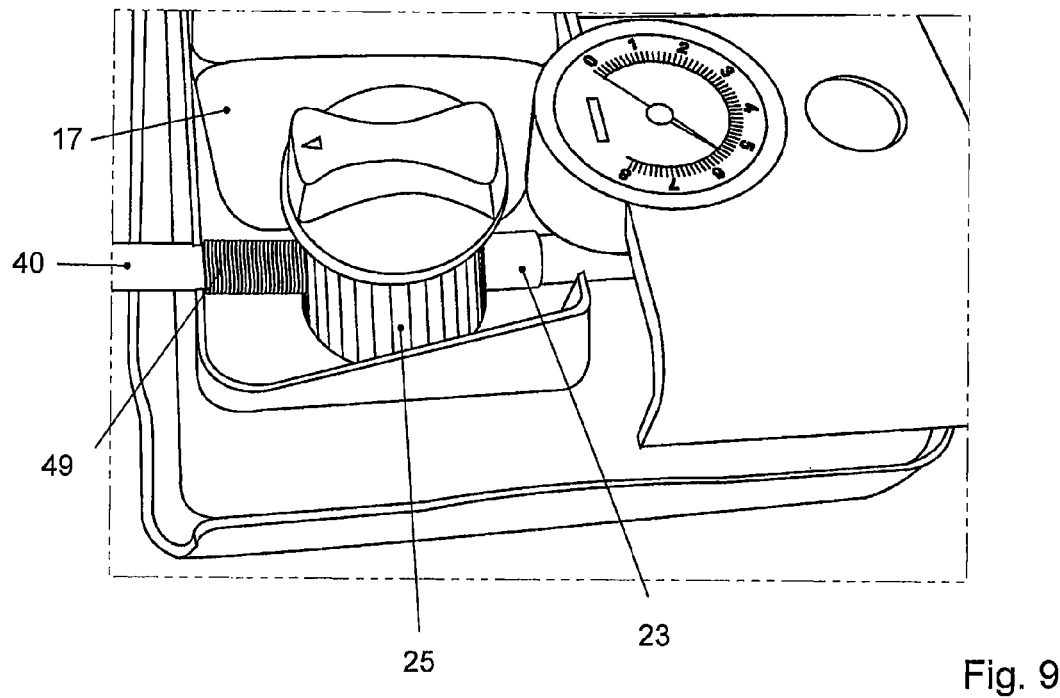
FIG. 9 is a partial view of the device according to FIG. 1 after the canister valve and fitting on the pressure source have been plugged together.

According to the invention, the device for dispensing tire sealant is assembled as follows:

To begin with, the rotary valve 25 is placed onto the canister 17 of tire sealant and this valve is also adjoined by a hose 40 shown in FIG. 9 for dispensing the tire sealant and for conveying air for example into a vehicle tire.

The compressed air source 16 is also installed ahead of time; if the transmission housing 37 is an integral component of the receptacle 2, this also can occur only upon installation of the compressed air source 16 into the receptacle. First, the bevel gear 31 is inserted into the transmission housing 37. This bevel gear 31 rotates around an axle 41 that protrudes from the bottom of the transmission housing 37. Then the output shaft 27 is inserted into the transmission part 34 from the closed side of the transmission housing so that it protrudes into the interior of the transmission housing 37. The bevel gear pinion 29 is then mounted onto this part of the output shaft 27 so that it engages in the teeth 30 of the bevel gear 31. The motor 26 is therefore attached to the transmission housing 37 together with the fan impeller 28. The end plate 39 of the pressure buildup element 33 is slid into the two vertical grooves 38.1 and 38.2 and a connecting rod eyelet 42 of the connecting rod 32 is slid onto an eccentric pin 43 that rotates in eccentric fashion around the axle 41. The compressed air source 16 is then ready for operation and can be inserted into the receptacle 2. The compartment 14 containing the compressed air source 16 is then covered by the cover part 3.2; a forked strut 44 engages behind the compressed air source 16 between the motor 26 and fan impeller 28. This ensures that the compressed air source 16 does not slide back and forth inside the compartment 14. This purpose is also served by the above-mentioned cutout in the partition wall 13, which accommodates the fitting 23. This cutout's counterpart in the cover part 3.2 is labeled with the reference numeral 45 in FIG. 6.

The above-described cooperation between undercut tabs 21.1 through 21.4 and the eyelets 22.1 through 22.4 closes the compartment 14 containing the compressed air source 16 and preferably, can only be opened by force.

Figure 2:
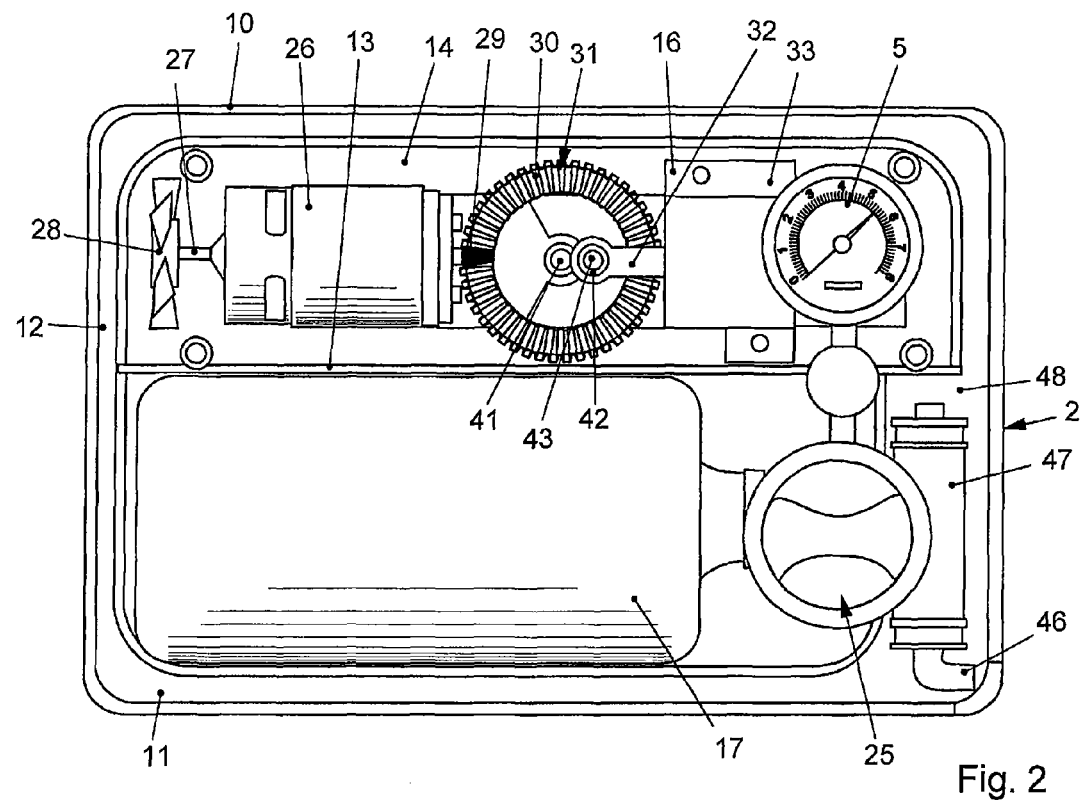
FIG. 2 is a top view of the opened device according to FIG. 1.
Figure 3:
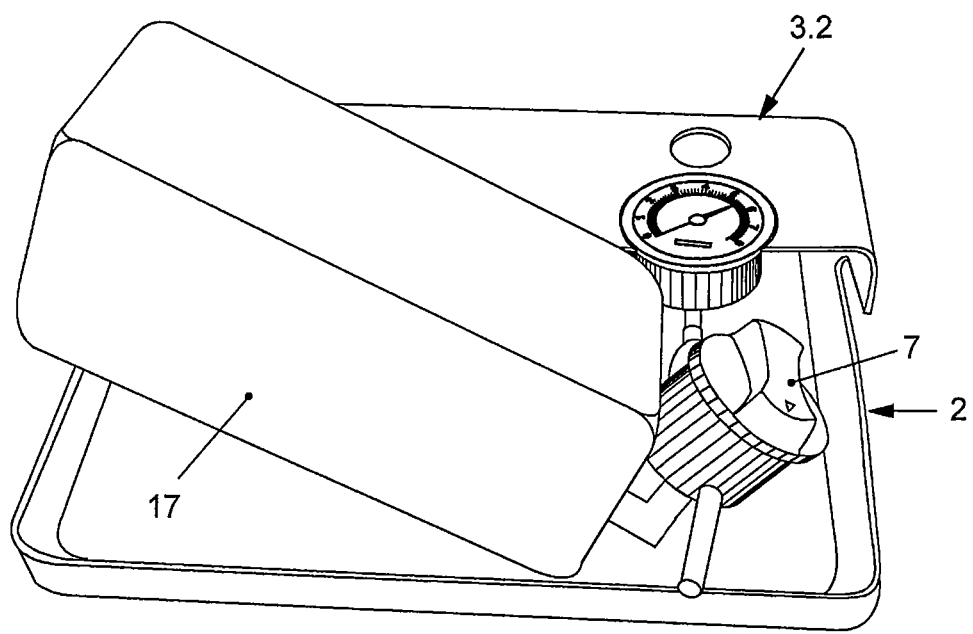
FIG. 3 is a perspective view of the opened device according to FIG. 2 during insertion of a canister.

Then, the canister 17, together with the rotary valve 25, is inserted into the compartment 15 of the receptacle 2. To accomplish this, however, the canister 17 must first be tilted as shown in FIG. 3 since otherwise, it cannot move past either the outer wall 10 or the inner wall 12. In this tilted position, the nipple 24 is then inserted into the fitting 23 and the canister 17 is pivoted into its home position shown in FIG. 2. In this home position, the canister 17 is contained in the compartment 15.

Operation of the compressed air source requires a connection to an energy source such as a cigarette lighter. A cable 46 for this purpose is preferably also placed in the trough 11 while an electrical connector 47 is accommodated in a chamber 48 above the rotary valve 25.

Then the compartment 15 can also be closed by the cover part 3.1 by inserting the clip feet 19.1 through 19.3 into the clip sockets 20.1 through 20.4. If it is necessary to electrically connect the device or to change the canister 17, it is sufficient to open this cover part 3.1 and take out the electrical connector 47 and/or to remove the canister 17 by performing the steps described above in reverse order and replace it with a new canister.

It is also conceivable to place the hose 40 in the trough 11; a wire helix 49 shown in FIG. 9 cooperating with corresponding hollow-ended struts 50 (see FIG. 4) prevents the hose 40 from being inadvertently pulled out of the rotary valve 25. The corresponding counterpart of the hollow-ended strut 50 in the cover part 3.1 is not shown.

If it is desirable for the entire device to remain closed, then it is naturally also possible to find room in the trough 11 for accommodating the electrical connector 47. In this case, it is not necessary to open the cover part 3.1.

The rotary valve has two or three preferred positions. In one position, the compressed air source 16 is closed, while in the second position, the compressed air source is directly connected to the hose 40 via the fitting 23 and the corresponding nipple 24 so that compressed air can be conveyed directly into a tire. In a third position, the compressed air source is connected to the interior of the canister 17 so that tire sealant can be dispensed through a bypass into the hose 40 and from there, into the tire.

The invention claimed is:

1. A device for dispensing tire sealant from a canister (17), the device comprising:
    a pressure source having a linear arrangement, the pressure source including a motor (26) connected to a pressure buildup element (33) in the linear arrangement;
    a housing containing the pressure source (16) and the canister (17), the housing including a first end, a second end opposite the first end, and a partition wall (13) extending between the first end and the second end, the partition wall (13) separating a first longitudinal compartment (14) and a second longitudinal compartment (15), wherein the canister (17) is disposed in the first longitudinal compartment (14) and parallel to the linear arrangement of the pressure source (16) in the second longitudinal compartment (15), and is removably connected to the pressure source (16) by a valve (25);
    the pressure buildup element (33) disposed at the first end of the housing; and
    the valve (25) disposed at the first end and including a canister fitting connectable to an end of the canister (17), the valve (25) including a nipple (24) disposed at an angle to the canister fitting and to the linear arrangement, the nipple (24) connecting the valve (25) to the pressure buildup element (33).

2. The device according to claim 1, wherein the pressure source (16) includes a fitting (23) in which the nipple (24) associated with the canister (17) engages in a sealed fashion.

3. The device according to claim 1, wherein the valve (25) comprises one of a rotary valve, a switch, and a tilting valve.

4. The device according to claim 1, wherein the fitting (23) protruding from the pressure source (16) extends through a cutout (45) in the wall (13).

5. The device according to claim 1, wherein the housing (1) includes a receptacle (2) that contains the canister (17) and pressure source (16), and the receptacle (2) includes an inner wall (12) that extends at least partway around the canister (17) and the pressure source (16).

6. The device according to claim 5, wherein the inner wall (12) is at least partially surrounded by an outer wall (10), forming a receiving trough (11).

7. The device according to claim 1, wherein the receptacle (2) is covered by a cover (3).

8. The device according to claim 7, wherein the cover (3) includes two parts.

9. The device according to claim 8, wherein a first part (3.1) of the cover covers the pressure source (16) and a second part (3.2) of the cover covers the canister (17).

10. The device according to claim 9, wherein one of the cover (3) or the two parts (3.1, 3.2) produce clipped connections (19.1-19.3, 20.1-20.4) with the receptacle (3).

11. The device according to claim 9, wherein the first part (3.1) associated with the canister (17) includes an opening (18) over the canister (17).

12. The device according to claim 7, wherein a slot (8) is provided in the housing (1), between the receptacle (2) and the cover (3), and one of a hose (40) for dispensing a tire sealant and a cable (46) for operating the pressure source (16) is inserted into the slot.

13. The device according to claim 5, wherein the receptacle (2) includes a chamber (48) for accommodating an electrical connector element (47).

14. The device according to claim 1, wherein the nipple (24) is disposed perpendicular to the canister fitting and to the linear arrangement.

15. The device according to claim 1, wherein the nipple (24) is disposed on a first side of the valve, the canister fitting is disposed on a second side of the valve, and a tire sealant discharge hose is disposed on a third side of the valve.

16. A device for dispensing tire sealant from a canister, the device comprising:

a housing including a receptacle having a first end and a second end opposite the first end, the receptacle divided into a first compartment and a second compartment by a partition wall extending between the first end and the second end, wherein the canister is removably disposed within the first compartment;

a pressure source having a linear arrangement within the second compartment, the pressure source including a pressure buildup element connected to a motor via a linear transmission, wherein the pressure buildup element is disposed at the first end of the receptacle;

a valve at the first end of the receptacle, within the first compartment, and disposed between and connecting the pressure buildup element to the canister, the valve including a tire sealant discharge hose extending out of the receptacle from the second compartment;

wherein the canister is disposed parallel to the linear arrangement of the pressure source and is removably connected to the pressure source at an end of the partition wall; and a cover that covers the receptacle, the cover including a removable first part that covers the first compartment and a fixed second part that covers the second compartment.

17. The device according to claim 16, further comprising each of the receptacle and the cover including an inner wall at least partially surrounded by an outer wall, and forming a receiving trough therebetween, wherein each of the first compartment and the second compartment is formed between the inner wall and the partition wall of the receptacle.

* * * * *